(12) United States Patent
Kawai et al.

(10) Patent No.: US 11,094,922 B2
(45) Date of Patent: Aug. 17, 2021

(54) METHODS FOR PRODUCING NONAQUEOUS ELECTROLYTE SECONDARY BATTERY AND ELECTRODE THEREOF

(71) Applicant: SANYO Electric Co., Ltd., Daito (JP)

(72) Inventors: Hidemasa Kawai, Hyogo (JP); Koichi Katayama, Hyogo (JP); Haruya Nakai, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 0 days.

(21) Appl. No.: 16/715,298

(22) Filed: Dec. 16, 2019

(65) Prior Publication Data

US 2020/0251721 A1      Aug. 6, 2020

(30) Foreign Application Priority Data

Jan. 31, 2019   (JP) .............................. JP2019-015398

(51) Int. Cl.
| | |
|---|---|
| *H01M 4/04* | (2006.01) |
| *H01M 4/139* | (2010.01) |
| *H01M 4/88* | (2006.01) |
| *B05D 1/26* | (2006.01) |
| *B05D 5/12* | (2006.01) |
| *B05D 3/04* | (2006.01) |

(52) U.S. Cl.
CPC ......... *H01M 4/139* (2013.01); *H01M 4/0404* (2013.01); *H01M 4/0471* (2013.01); *B05D 1/26* (2013.01); *B05D 3/048* (2013.01); *B05D 3/0413* (2013.01); *B05D 3/0426* (2013.01); *B05D 3/0473* (2013.01); *B05D 5/12* (2013.01); *H01M 4/8878* (2013.01); *H01M 4/8882* (2013.01)

(58) Field of Classification Search
USPC .................................................. 427/115, 348
See application file for complete search history.

(56) References Cited

U.S. PATENT DOCUMENTS

| | | | | |
|---|---|---|---|---|
| 2,681,375 A | * | 6/1954 | Vogt ........................ | H01M 4/02 429/94 |
| 3,174,219 A | * | 3/1965 | Horn et al. ............. | H01M 4/80 419/9 |

(Continued)

FOREIGN PATENT DOCUMENTS

| | | | |
|---|---|---|---|
| CN | 104659339 | * | 5/2015 |
| JP | 11-102696 | * | 4/1999 |

(Continued)

*Primary Examiner* — Brian K Talbot
(74) *Attorney, Agent, or Firm* — Westerman, Hattori, Daniels & Adrian, LLP (57) ABSTRACT

A negative electrode active material slurry is applied to one surface of a strip-shaped negative electrode core so as to form multiple lines of the negative electrode active material slurry, the lines extending in an X direction and being spaced from each other in a Y direction. Subsequently, while keeping the negative electrode core aloft, first hot air is blown toward the negative electrode core from at least a lower side in a vertical direction, and then, while keeping the negative electrode core aloft, first cooling air having a lower temperature than the first hot air is blown toward the negative electrode core from at least the lower side in the vertical direction so as to decrease the temperature of the negative electrode core to 40° C. or lower.

7 Claims, 7 Drawing Sheets

(56) References Cited

U.S. PATENT DOCUMENTS

| | | | | |
|---|---|---|---|---|
| 3,203,831 | A | * | 8/1965 | Jeannin ..................... B22F 7/04 |
| | | | | 427/545 |
| 3,247,086 | A | * | 4/1966 | Goldstein .............. C25D 11/34 |
| | | | | 205/206 |
| 2014/0079872 | A1 | * | 3/2014 | Uchida ................. H01M 4/621 |
| | | | | 427/58 |
| 2017/0207442 | A1 | * | 7/2017 | Ho ........................ H01M 4/139 |

FOREIGN PATENT DOCUMENTS

| | | | |
|---|---|---|---|
| JP | H11-102696 A | | 4/1999 |
| JP | 2006-073234 A | | 3/2006 |
| JP | 2015-032466 | * | 2/2015 |
| KR | 101810146 | * | 12/2017 |

* cited by examiner

METHODS FOR PRODUCING NONAQUEOUS ELECTROLYTE SECONDARY BATTERY AND ELECTRODE THEREOF

CROSS REFERENCE TO RELATED APPLICATIONS

The present invention application claims priority to Japanese Patent Application No. 2019-015398 filed in the Japan Patent Office on Jan. 31, 2019, the entire contents of which are incorporated herein by reference.

BACKGROUND OF THE INVENTION

Field of the Invention

The present disclosure relates to a method for producing an electrode of a nonaqueous electrolyte secondary battery and a method for producing a nonaqueous electrolyte secondary battery.

Description of Related Art

Japanese Published Unexamined Patent Application No. 11-102696 (Patent Document 1) describes an apparatus for producing an electrode of a nonaqueous electrolyte secondary battery. This apparatus is equipped with a feed roll, a winding roll, a coater, a drying furnace, and a cooling section. The feed roll rotates in one direction and thereby feeds a metal foil. The coater applies a coating material containing an active material to the metal foil and thereby forms a coating film. The drying furnace heats and dries the coating film formed by the coater. The metal foil is stretched between the feed roll and the winding roll and travels from the feed roll toward the winding roll. A particular tension is applied to the metal foil by the feed roll, the winding roll, and guide rolls installed in the midway and travels stably.

After the coating film is dried in the drying furnace, the metal foil is cooled naturally and then wound around the winding roll.

BRIEF SUMMARY OF THE INVENTION

The inventors of the present invention have found that the following issues arise for the aforementioned method for producing an electrode of a nonaqueous electrolyte secondary battery involving natural cooling. That is, it has been found that, when an electrode is produced by applying an active material slurry to a core to form multiple lines of the slurry spaced from each other in the width direction of the core and then performing natural cooling, the electrode may have wrinkles in uncovered portions where the active material slurry was not applied.

Thus, the present disclosure provides a method for producing an electrode of a nonaqueous electrolyte secondary battery and a method for producing a nonaqueous electrolyte secondary battery with which wrinkles are rarely formed.

According to an aspect of the present disclosure, there is provided a method for producing an electrode of a nonaqueous electrolyte secondary battery, the method including: an applying step of applying an active material slurry containing an active material, a binder, and a dispersion medium to one surface of a strip-shaped core so as to form multiple lines of the active material slurry, the lines extending in a longitudinal direction of the core and being spaced from each other in a width direction of the core; after the applying step, a drying step of blowing first hot air to the core from at least a lower side in a vertical direction while keeping the core aloft; and after the drying step, a cooling step of blowing first cooling air having a lower temperature than the first hot air from at least the lower side in the vertical direction while keeping the core aloft so as to cool the core until the core has a temperature of 40° C. or lower.

According to the method for producing a nonaqueous electrolyte secondary battery and the method for producing an electrode of a nonaqueous electrolyte secondary battery of the present disclosure, wrinkling of the electrode can be suppressed.

BRIEF DESCRIPTION OF THE SEVERAL VIEWS OF THE DRAWINGS

FIGS. 8A and 8B are a diagram and a graph used to describe warping of an electrode plate observed when the temperature of a hot plate on which the electrode plate obtained by applying an active material slurry to one surface of an aluminum foil is placed is elevated.

DETAILED DESCRIPTION OF THE INVENTION

Embodiments of the present disclosure will now be described in detail with reference to the attached drawings.

In the description below, when more than one embodiments and modification examples are included, it is anticipated from the beginning that the features thereof may be appropriately combined to construct new embodiments. In addition, in the embodiments below, the same components are represented by the same reference signs in the drawings, and the descriptions therefor are omitted to avoid redundancy. The drawings include schematic views, and the dimensional ratios, such as the length, the width, the height, etc., of the components are not necessarily consistent between different drawings. In the description below, an example in which a negative electrode of a prismatic secondary battery is produced is described. However, the method for producing an electrode of a nonaqueous electrolyte secondary battery according to the present disclosure may be used to produce a positive electrode of a prismatic secondary battery or one or both of a positive electrode and a negative electrode of a cylindrical secondary battery. Furthermore, in the description below and the drawings, the X direction refers to the longitudinal direction of a long (strip-shaped) negative electrode core 16 before cutting, the Y direction refers to the width direction of the negative electrode core 16, and the Z direction refers to the thickness direction of the negative electrode core 16. The X direction, the Y direction, and the Z direction are orthogonal to one another. The negative electrode core 16 to which a negative electrode active material 12a has been applied is dried and cooled while the Z direction is coincident with a substantially vertical direction. Since the negative electrode core 16 sags due to gravity force, strictly speaking, the Z direction is never coincident with the vertical direction. Moreover, of the constituent elements described below, those constituent elements that are not recited in independent claims constituting the highest concepts are optional constituent elements and not essential.

Figure 1:
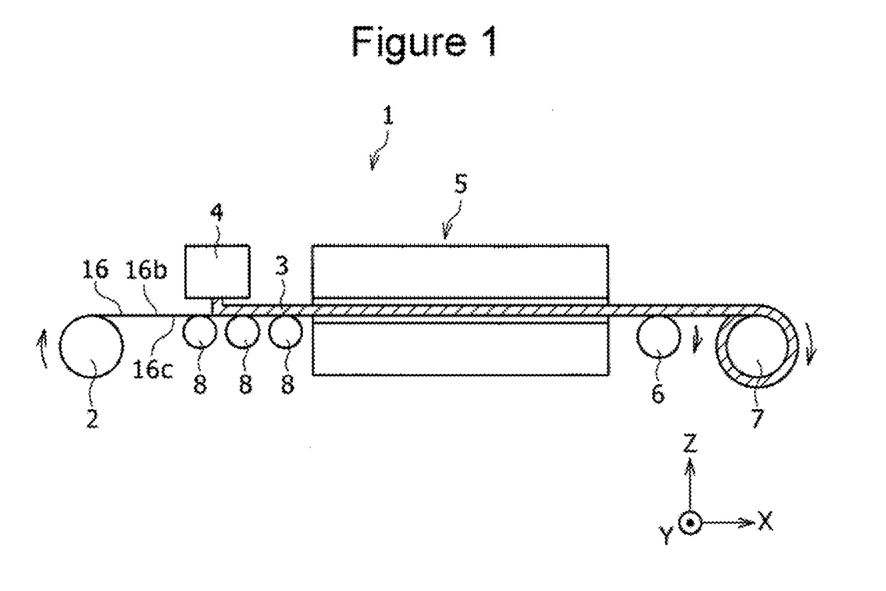
FIG. 1 is a schematic diagram of an applying, drying, and cooling apparatus that performs application of a negative electrode active material slurry, and dries and cools a negative electrode core after application of the negative electrode active material slurry.

First, an applying, drying, and cooling apparatus 1 that performs application of a negative electrode active material slurry to a negative electrode core before cutting, and drying and cooling of the negative electrode core to which the negative electrode active material slurry has been applied is briefly described. As illustrated in FIG. 1, the applying, drying, and cooling apparatus 1 is equipped with a feed roll 2 that feeds a core, a discharge unit 4 that applies an active material slurry to an upper surface of the travelling core, a drying and cooling unit 5 that heat-dries and cools the active material slurry discharged onto the upper surface of the core by the discharge unit 4, more than one guide rolls 8 that are disposed between the discharge unit 4 and the drying and cooling unit 5 and guide the core, a guide roll 6 that guides the core fed from the drying and cooling unit 5, and a winding roll 7 that winds the core that has passed through the guide roll 6.

The applying, drying, and cooling apparatus 1 feeds the long (strip-shaped) negative electrode core 16, which is wound into a roll, before cutting to the discharge unit 4 at a constant speed from the feed roll 2 by using the feed roll 2 and the winding roll 7, and the discharge unit 4 applies the negative electrode active material slurry 3 to particular regions in an upper surface of the negative electrode core 16. Subsequently, the negative electrode core 16 onto which the negative electrode active material slurry 3 has been discharged is fed to the drying and cooling unit 5 by being guided by the guide rolls 8, and cooled in the drying and cooling unit 5 after the negative electrode active material slurry 3 is dried. The negative electrode core 16 dried and cooled in the drying and cooling unit 5 is passed through the guide roll 6 and wound around the winding roll 7. A portion of the negative electrode core 16 located within the drying and cooling unit 5 is kept aloft while the width direction (Y direction) of the negative electrode core 16 is oriented in a substantially horizontal direction. Preferably, the negative electrode core 16 is kept aloft by the air pressure from the lower side. The portion of the strip-shaped negative electrode core 16 located inside the drying and cooling unit 5 is more preferably kept aloft while the surface of the negative electrode core 16 coated with the negative electrode active material slurry 3 is arranged substantially horizontally. Moreover, until the negative electrode core is heated, the negative electrode core 16 does not have to be kept aloft.

Figure 2:
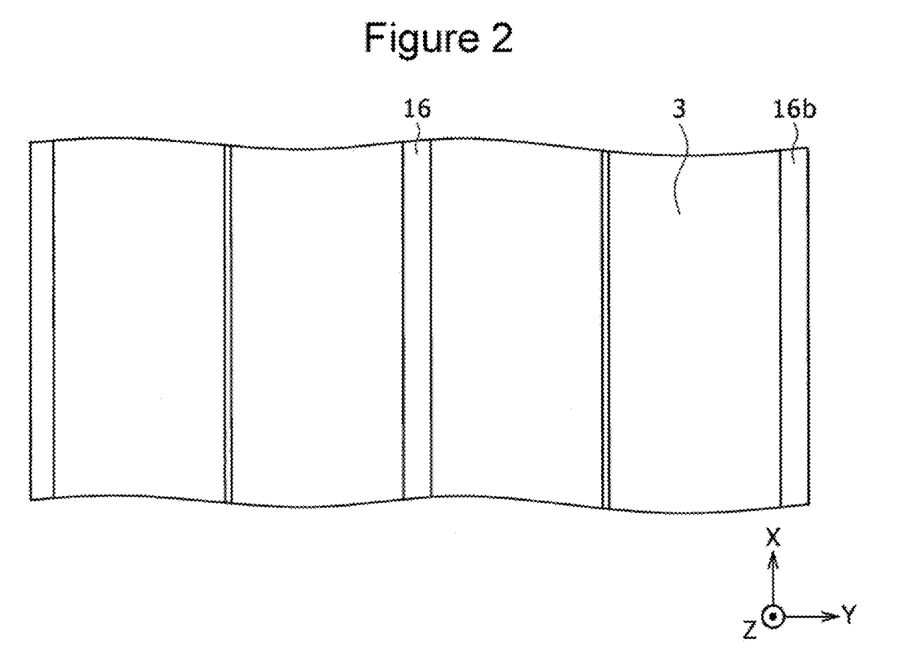
FIG. 2 is a plan view illustrating regions where negative electrode active material layers are formed on a negative electrode core before cutting.

Next, application of the negative electrode active material slurry 3 to the long negative electrode core 16 before cutting is described in further detail. The negative electrode active material slurry 3 is applied to one surface 16b of the strip-shaped negative electrode core 16 as follows, for example. As illustrated in FIG. 1, the discharge unit 4 extends in the width direction (Y direction) of the negative electrode core 16 and is disposed above the negative electrode core 16 in the vertical direction (substantially coincident with the Z direction). Four discharge nozzles (not illustrated) with particular intervals therebetween in the Y direction are disposed on the lower side (the side close to the negative electrode core 16) of the discharge unit 4. In this state, by feeding the negative electrode core 16 by the feed roll 2, the negative electrode core 16 is conveyed at a constant speed toward one side in the longitudinal direction (X direction or winding direction) of the negative electrode core 16, and travels at a constant speed relative to the discharge unit 4 in the X direction under the discharge unit 4. In this state, the negative electrode active material slurry 3 is continuously discharged toward the negative electrode core 16 from the four discharge nozzles that are arranged to have particular intervals therebetween in the Y direction. As a result, the negative electrode active material slurry 3 is applied to the negative electrode core 16. As such, as illustrated in FIG. 2, four lines of the paste-form negative electrode active material slurry 3 are applied to one surface (upper surface) 16b of the negative electrode core 16. The negative electrode core 16 can be formed of a copper or copper alloy foil having a thickness of about 5 to 15 μm.

The negative electrode active material slurry 3 is prepared by mixing a negative electrode active material with a conductive agent, a binder, and the like, and kneading the resulting mixture in a dispersion medium. The negative electrode active material is not particularly limited as long as lithium can be reversibly intercalated and deintercalated, and examples thereof include carbon materials, silicon materials, lithium metal, metals and alloy materials that alloy with lithium, and metal oxides. From the viewpoint of the raw material cost, the negative electrode active material is preferably a carbon-based active material, and examples thereof include natural graphite, artificial graphite, mesophase pitch-based carbon fibers (MCF), mesocarbon microbeads (MCMB), coke, and hard carbon. In particular, from the viewpoint of improving the high-rate charge/discharge properties, a carbon material obtained by coating a graphite material with low-crystalline carbon is preferably used as the negative electrode active material.

A fluororesin, PAN, a polyimide resin, an acrylic resin, a polyolefin resin, or the like may be used as the binder, but preferably styrene-butadiene rubber (SBR) or a modified product thereof is used. Examples of the conductive agent include carbon black, acetylene black, furnace black, Ketjen black, and graphite. A preferable example of the solvent is N-methyl-2-pyrrolidone (NMP).

Figure 3:
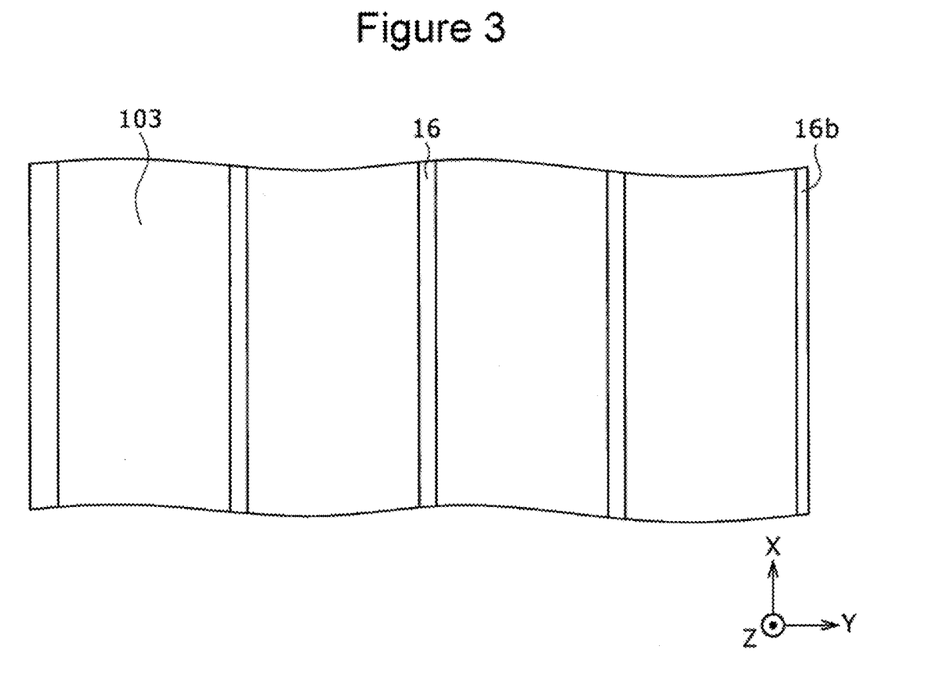
FIG. 3 is a plan view illustrating regions where negative electrode active material layers are formed on a negative electrode core before cutting in a negative electrode according to a modification example.

In the example illustrated in FIG. 2, the intervals between the four discharge nozzles in the discharge unit in the Y direction are set such that the interval between the first discharge nozzle and the second discharge nozzle from one side in the Y direction is equal to the interval between the third discharge nozzle to the fourth discharge nozzle and that the interval between the second discharge nozzle and the third discharge nozzle is larger than the interval between the first discharge nozzle and the second discharge nozzle. Four lines of the negative electrode active material slurry 3 extending in the X direction are applied so that regions covered with the negative electrode active material slurry 3 and portions (negative electrode core exposed portions) where the negative electrode core is left exposed alternate in the Y direction on the long negative electrode core 16 before cutting. Alternatively, four discharge nozzles equally spaced from each other in the Y direction may be provided in the discharge unit, and, as illustrated in FIG. 3, a negative electrode active material slurry 103 may be discharged into four lines equally spaced from each other in the Y direction. Alternatively, two or five or more lines of the negative electrode active material slurry may be formed on the negative electrode core, with intervals between lines in the Y direction.

Figure 4:
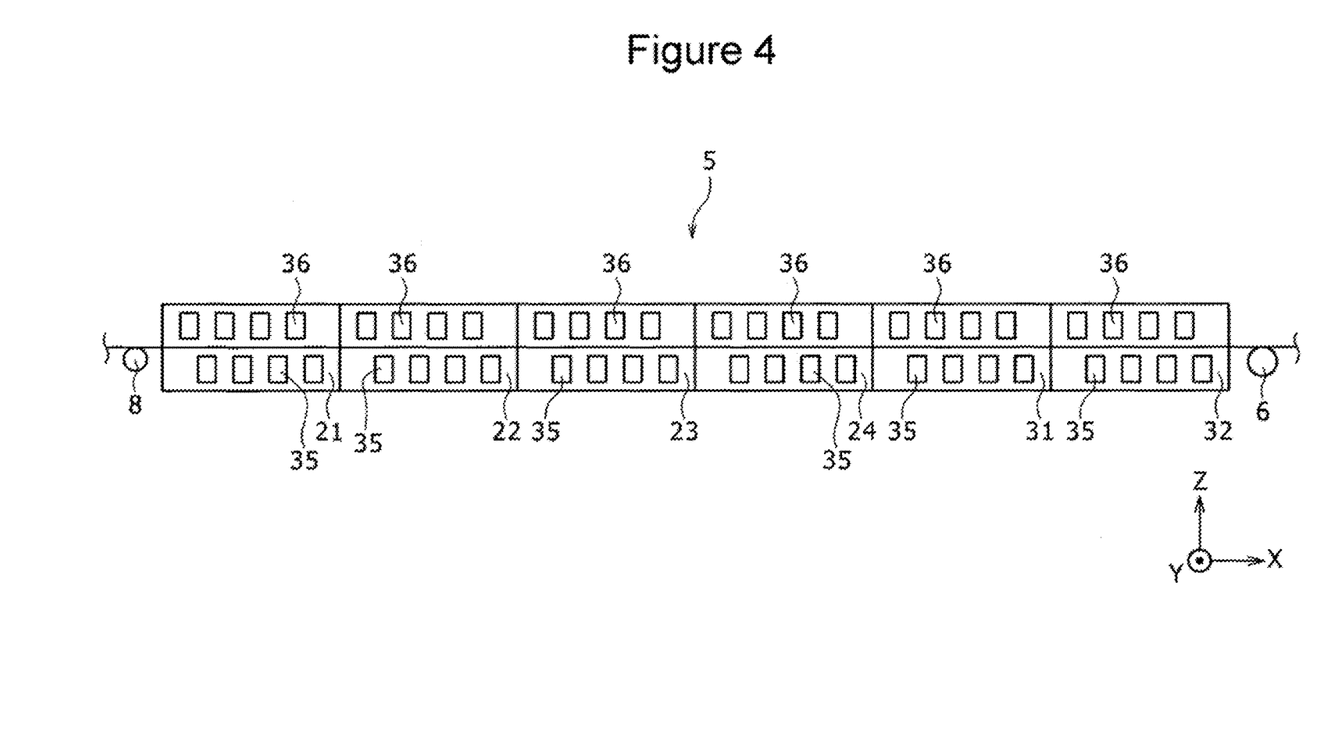
FIG. 4 is a schematic diagram illustrating a structure of a drying and cooling unit.

Next, the long negative electrode core 16 before cutting having the negative electrode active material slurry applied to one surface 16*b* in the vertical direction is dried. Drying is performed as follows. That is, as illustrated in FIG. 4, the drying and cooling unit 5 includes first to fourth drying chambers 21 to 24 and first and second cooling chambers 31 and 32. Each of the chambers 21 to 24, 31, and 32 includes multiple lower side air blowers 35 and multiple upper side air blowers 36. The drying chambers 21 to 24 can each be constituted by a drying furnace. Each of the lower side air blowers and the upper side air blowers is, for example, constituted by a fan.

For example, the lower side air blowers 35 installed in each of the chambers 21 to 24, 31, and 32 are equally spaced from each other in the X direction, and the upper side air blowers 36 installed in each of the chambers 21 to 24, 31, and 32 are also equally spaced from each other in the X direction. As illustrated in FIG. 4, the lower side air blowers 35 and the upper side air blowers 36 are preferably alternately arranged in the X direction. The lower side air blowers 35 blow hot air or cooling air to the entire lower surface 16*c* of the negative electrode core 16 in the Y direction of the negative electrode core 16, and thereby the negative electrode core 16 is kept aloft. Moreover, the upper side air blowers 36 blow hot air or cooling air from the upper side of the negative electrode core 16 that is kept aloft so that the entire surface 16*b* of the negative electrode core 16 in the Y direction is blown by the air.

The hot air preferably has a temperature of 50° C. or higher, more preferably 50° C. to 150° C., and yet more preferably 60° C. to 150° C. The hot air may be any gas, and, for example, atmospheric air or the like can be used.

The temperature of the cooling air is not particularly limited as long as the core can be cooled to 40° C. or lower. For example, the cooling air preferably has a temperature of 40° C. or lower, more preferably 10° C. to 40° C., and yet more preferably 20° C. to 35° C. The cooling air may be any gas, and, for example, atmospheric air or the like can be used. In the process of cooling the core having a temperature higher than 40° C. to 40° C. or lower, cooling air having a temperature of 40° C. or higher may be blown toward the core in the cooling chambers. Thus, it suffices if a process of cooling the core to a temperature of 40° C. or lower is included in at least part of the cooling step.

The temperature in each of the first to fourth drying chambers 21 to 24 can be set to, for example, 80° C. to 130° C., and the temperature of the first cooling chamber 31 can be set to a temperature lower than the temperatures in the first to fourth drying chambers 21 to 24, for example, can be set to 20° C. to 75° C. The temperature in the second cooling chamber 32 is set to, for example, 40° C. or lower, preferably 35° C. or lower, more preferably 28° C., 27° C., or 26° C. or lower, and most preferably 25° C. or lower.

Since the temperatures in the first to fourth drying chambers 21 to 24 are set to such high temperatures, hot air is blown toward the negative electrode core 16 from the lower side air blowers 35 and the upper side air blowers 36 installed in the first to fourth drying chambers 21 to 24. The hot air blown toward the negative electrode core 16 from the lower side air blowers 35 installed in the first to fourth drying chambers 21 to 24 constitutes first hot air, and the hot air blown toward the negative electrode core 16 from the upper side air blowers 36 installed in the first to fourth drying chambers 21 to 24 constitutes second hot air. In each of the drying chambers 21 to 24, the temperature of the first hot air blown from the lower side air blowers 35 toward the negative electrode core 16 is the same or substantially the same as the temperature of the second hot air blown from the upper side air blowers 36 toward the negative electrode core 16.

Since the temperatures in the first and second cooling chambers 31 and 32 are set to be lower than the temperatures in the first to fourth drying chambers 21 to 24, cooling air having a temperature lower than the hot air blown toward the negative electrode core 16 in the first to fourth drying chambers 21 to 24 is blown toward the negative electrode core 16 from the lower side air blowers 35 and the upper side air blowers 36 installed in the first and second cooling chambers 31 and 32. The cooling air blown toward the negative electrode core 16 from the lower side air blowers 35 installed in the first and second cooling chambers 31 and 32 constitutes first cooling air, and the cooling air blown toward the negative electrode core 16 from the upper side air blowers 36 installed in the first and second cooling chambers 31 and 32 constitutes second cooling air. In each of the cooling chambers 31 and 32, the temperature of the first cooling air blown from the lower side air blowers 35 toward the negative electrode core 16 is the same or substantially the same as the temperature of the second cooling air blown from the upper side air blowers 36 toward the negative electrode core 16.

The first cooling chamber 31 is located upstream of the second cooling chamber 32 in the direction of the movement of the negative electrode core 16, and the temperature in the first cooling chamber 31 is preferably set to be higher than the temperature in the second cooling chamber 32. In each of the chambers 21 to 24, 31, and 32, air may be blown only from the lower side air blowers 35, and the upper side air blowers 36 may be omitted. Blowing air from the lower side air blowers 35 can apply an upward force to the negative electrode core, and the negative electrode core 16 can be unfailingly kept aloft. The case described herein involves a drying and cooling unit 5 equipped with four drying chambers 21 to 24 and two cooling chambers 31 and 32. Alternatively, the drying and cooling unit may be equipped with any number (1 or more) of drying chambers, and any number (1 or more) of cooling chambers. What matters is that the negative electrode active material slurry applied to the negative electrode core can be sufficiently dried in one or more drying chambers and that the negative electrode core having the dried negative electrode active material slurry thereon can be ultimately cooled to 40° C. or lower and preferably 35° C. or lower in one or more cooling chambers. When cooling the negative electrode core having the dried negative electrode active material slurry thereon, the negative electrode core may be cooled to any temperature. The lower limit of the temperature to which the negative electrode core is cooled can be an ambient temperature (environment temperature) or a temperature between −20° C. and 10° C., and, for example, may be 0° C., 5° C., 10° C., or 20° C.

Figure 5:
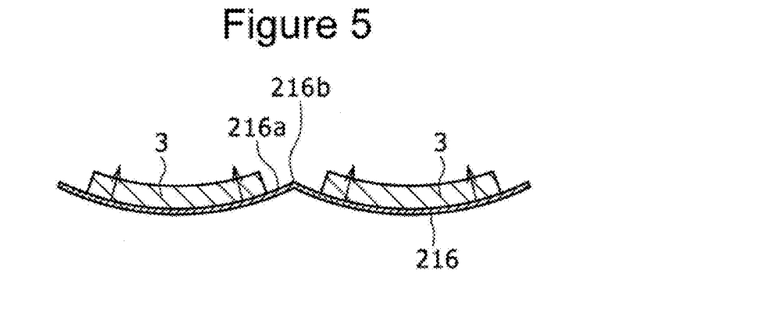
FIG. 5 is a schematic cross-sectional view including a width direction and a thickness direction of a warped negative electrode.

In the drying method of the present disclosure, instead of natural cooling performed in Patent Document 1, the cooling chambers 31 and 32 are deliberately provided to cool the core to 40° C. or lower and preferably 35° C. or lower. The reason for this is as follows. The negative electrode active material slurry 3 contracts due to evaporation of the dispersion medium in the drying step whereas the negative electrode core 16 thermally expands. Thus, the negative electrode warps due to the thermal expansion difference between the negative electrode active material slurry 3 and the negative electrode core 16. In the case where multiple lines of the negative electrode active material slurry 3 are applied to the negative electrode core 16 before cutting as in the method of the present disclosure, an upward projecting cuspidal point 216b is frequently formed in a negative electrode core exposed portion (uncovered portion) 216a between the lines of the negative electrode active material slurry 3 adjacent in the Y direction, as illustrated in FIG. 5.

Figure 6:
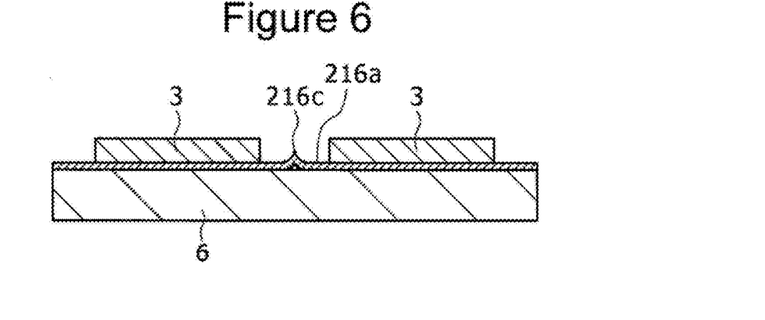
FIG. 6 is a schematic cross-sectional view including a width direction and a thickness direction of a negative electrode of a reference example in which wrinkles occurred in a negative electrode core exposed portion as a result of contact with a guide roll.

When a negative electrode core 216 with the cuspidal point 216b generated therein contacts the guide roll 6 and thereby receives a force that corrects the warping, a wrinkle 216c occurs in the negative electrode core exposed portion (uncovered portion) 216a as illustrated in FIG. 6. It becomes difficult to produce a high-quality secondary battery if the wrinkle 216c occurs in the negative electrode core exposed portion 216a.

In contrast, according to the method for producing a negative electrode of the present disclosure described above, before the negative electrode core 16 contacts the guide roll 6, the negative electrode core 16 is cooled to a temperature of 35° C. or lower by blowing cooling air to the negative electrode core 16 while the negative electrode core 16 is kept aloft. Thus, when the negative electrode core 16 contacts the guide roll 6, the warping of the negative electrode core 16 can be suppressed to a level that does not cause the wrinkle 216c. Thus, occurrence of the wrinkle 216c in the produced negative electrode 12 (see FIG. 9) can be prevented.

As is clear from the wrinkle generation mechanism described above, wrinkling cannot be prevented unless warping of the negative electrode core 16 is suppressed by cooling the negative electrode core itself. Thus, even when the guide roll 6 that guides the negative electrode core 16 is cooled as described in Patent Document 1, warping of the negative electrode core 16 cannot be suppressed unless the temperature of the negative electrode core is decreased.

Figure 7:
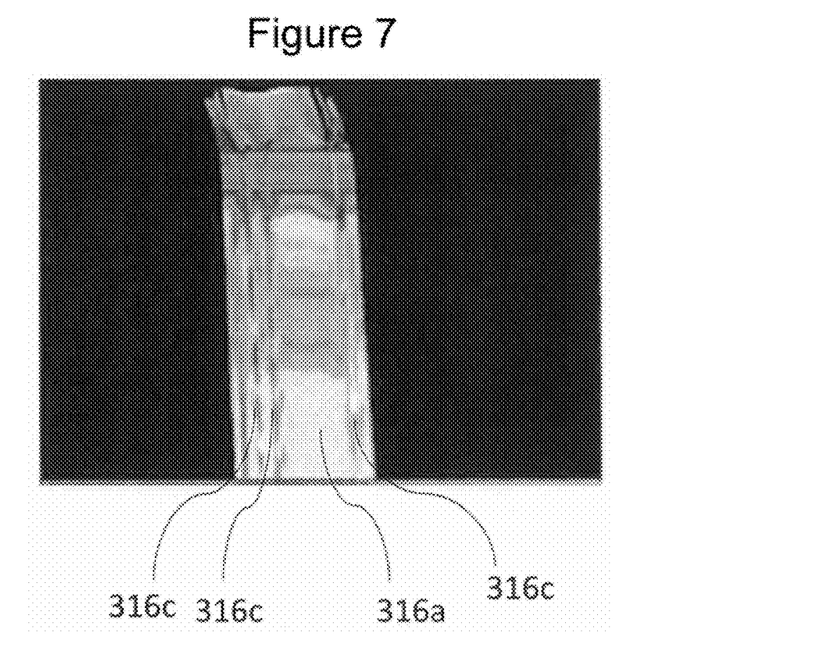
FIG. 7 is a photograph of a positive electrode core exposed portion having wrinkles.

It should be noted that the present disclosure is applicable to a positive electrode since the positive electrode has the same issue as the negative electrode. FIG. 7 is a photograph illustrating occurrence of wrinkles 316c in a positive electrode core exposed portion 316a in a positive electrode produced by a known method. The larger the coating weight of the active material slurry applied to the core, the larger the contraction of the active material slurry and the larger the warping amount. As a result, the core is more likely to have wrinkles.

Figure 8A:
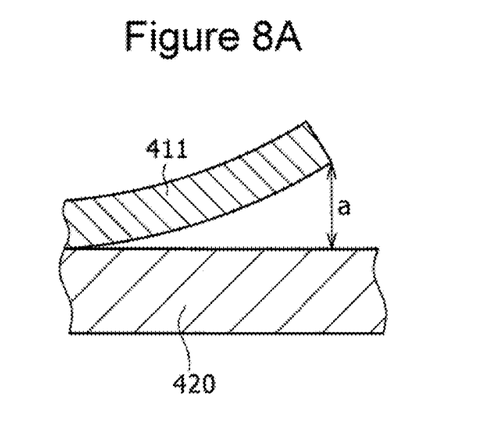
FIG. 8A is a schematic cross-sectional view including a width direction and a thickness direction and illustrating upward warping at an edge of the electrode plate in the width direction.
Figure 8B:
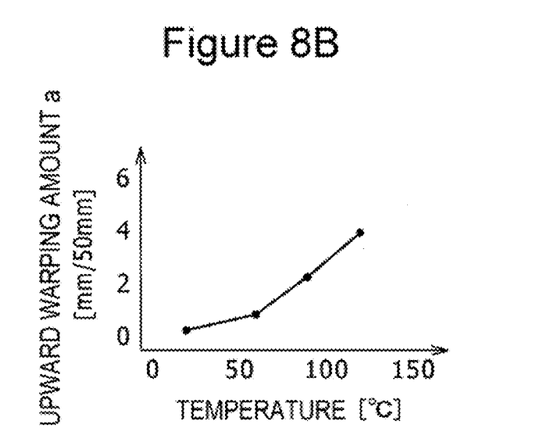
FIG. 8B is a graph illustrating the relationship between the hot plate temperature and the upward warping.

FIG. 8A is a diagram illustrating warping of an electrode plate observed when a test positive electrode 411 obtained by applying a positive electrode active material slurry to one surface of an aluminum positive electrode core having a thickness of 13 μm is placed on a hot plate 420 and the temperature of the hot plate 420 is elevated. FIG. 8B is a graph illustrating the relationship between the upward warping and the electrode plate temperature when an aluminum foil having a thickness of 13 μm is used. The upward warping indicated by a in FIG. 8A at an edge of the test positive electrode 411 in the width direction increases monotonically with the increase in the temperature of the hot plate 420, as illustrated in FIG. 8B. As is clear from this test, wrinkles more readily occur in the positive electrode core as the temperature of the aluminum positive electrode core increases.

For producing a negative electrode, as described above, the negative electrode core 16 having the one surface 16b to which the negative electrode active material slurry 3 has been applied is dried, cooled, and wound around the winding roll 7. Then, the negative electrode active material slurry 3 is applied to the other surface 16c (see FIG. 1) of the negative electrode core 16, and the negative electrode core 16 is dried, cooled, and wound around the winding roll 7. The negative electrode active material slurry 3 is applied to the other surface 16c. The amount and the raw materials of the negative electrode active material slurry 3 and the method for applying the negative electrode active material slurry 3 are the same as those for the surface 16b. In addition, the applied negative electrode active material slurry 3 is dried and cooled under the same conditions as and by the same method as those for the surface 16b. Subsequently, the negative electrode core 16 having the negative electrode active material formed on both surfaces 16b and 16c is compressed in the thickness direction to form negative electrode active material layers on both surfaces of the negative electrode core 16. Lastly, the negative electrode core 16 having the negative electrode active material layers formed thereon is cut into particular dimensions to produce a negative electrode 12. Alternatively, after the negative electrode core 16 having the surface 16b to which the negative electrode active material slurry 3 has been applied is dried and cooled, winding of the negative electrode core 16 with the winding roll 7 may be omitted, and the negative electrode active material slurry 3 may be applied to the other surface 16c of the negative electrode core 16, followed by drying and cooling of the negative electrode core 16.

Subsequently, for example, a prismatic secondary battery is produced as follows by using the prepared negative electrode 12. First, a positive electrode is prepared by the same method as the negative electrode 12. The positive electrode active material slurry contains a positive electrode active material, a conductive agent, a binder, etc. For the positive electrode also, the positive electrode core to which the positive electrode active material slurry has been applied is dried by blowing only first hot air or both first hot air and second hot air in the drying chambers, and then the positive electrode core is cooled to 40° C. or lower, preferably 35° C. or lower, more preferably 28° C. or lower, 27° C. or lower, or 26° C. or lower, or most preferably 25° C. or lower by blowing only first cooling air or both first cooling air and second cooling air in the cooling chambers by the same method as for the negative electrode.

A strip-shaped aluminum or aluminum alloy foil having a thickness of about 10 to 20 μm can be employed as the positive electrode core. The positive electrode active material may be any appropriate compound that can reversibly intercalate/deintercalate lithium ions. The positive electrode active material is preferably a lithium transition metal complex oxide. For example, lithium transition metal composite oxides represented by $LiMO_2$ (where M represents at least one element selected from Co, Ni, and Mn) that can reversibly intercalate/deintercalate lithium ions, such as $LiCoO_2$, $LiNiO_2$, $LiNi_yCo_{1-y}O_2$ (y=0.01 to 0.99), $LiMnO_2$, $LiCo_xMn_yNi_zO_2$ (x+y+z=1), $LiMn_2O_4$, and $LiFePO_4$, can be used alone or as a mixture of two or more. Furthermore, a mixture containing a lithium cobalt complex oxide and a different metal element such as zirconium, magnesium, aluminum, or tungsten, can also be used.

Examples of the binder include fluororesins such as polytetrafluoroethylene (PTFE) and polyvinylidene fluoride (PVdF), polyacrylonitrile (PAN), polyimide, acrylic resins, and polyolefin. Any of these resins may be used in combination with a cellulose derivative such as carboxymethyl cellulose (CMC) or a salt thereof, polyethylene oxide (PEO), and the like. Examples of the conductive agent include carbon black, acetylene black, furnace black, Ketjen black, and graphite. A preferable example of the solvent used to prepare the positive electrode active material slurry is NMP.

Figure 9:
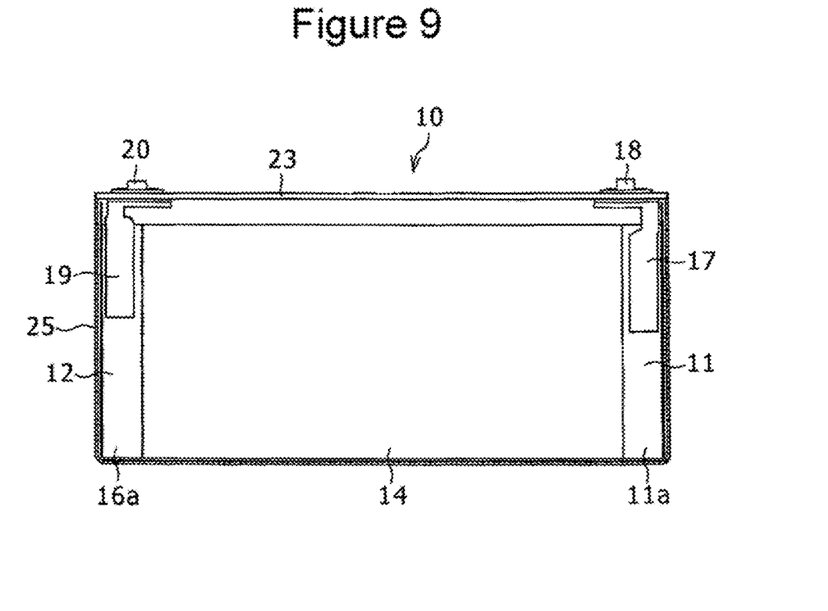
FIG. 9 is a front view of a relevant portion of a prismatic secondary battery that can be produced by the method of the present disclosure.
Figure 10:
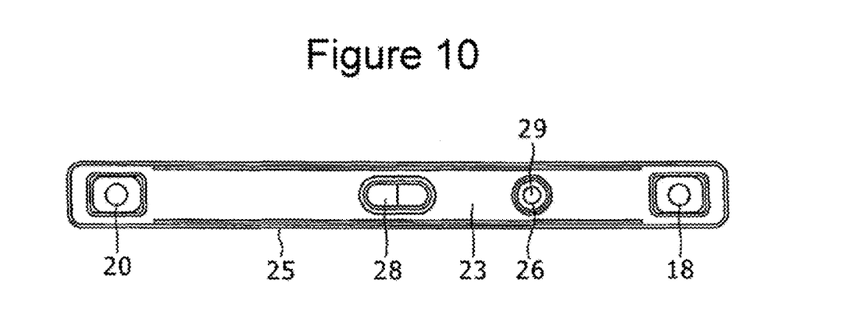
FIG. 10 is a plan view of the prismatic secondary battery.

Then, referring to FIGS. 9 and 10, the prepared positive electrode 11 and negative electrode 12 and a separator formed of a polyethylene microporous membrane and disposed between the electrodes are wound, and the resulting roll is pressed in the radial direction to prepare a flat-shaped wound electrode assembly 14 having a wound structure. A positive electrode terminal 18 is attached to a sealing plate 23, and a positive electrode current collector 17 is connected to the positive terminal 18. A negative electrode terminal 20 is attached to the sealing plate 23, and a negative electrode current collector 19 is connected to the negative electrode terminal 20. The positive electrode current collector 17 and the positive electrode terminal 18 are insulated from the sealing plate 23 with a resin insulating member. The negative electrode current collector 19 and the negative electrode terminal 20 are insulated from the sealing plate 23 with a resin insulating member. Then, the positive electrode current collector 17 is welded to a positive electrode core exposed portion 11a in the positive electrode 11, and the negative electrode current collector 19 is welded to the core exposed portion 16a in the negative electrode 12. The electrode assembly 14 is placed in a prismatic outer casing can 25, and the opening of the outer casing can 25 is covered with the sealing plate 23. The sealing plate 23 has an electrolyte pouring port 26 and a gas discharge valve 28, and a nonaqueous electrolyte is poured into the outer casing can 25 through the electrolyte pouring port 26 formed in the sealing plate 23. Then a sealing plug 29 is fitted to the electrolyte pouring port 26. Thus, a prismatic secondary battery 10, which is one example of the nonaqueous electrolyte secondary battery, is obtained.

A polyolefin microporous membrane can be used as the separator, for example. Alternatively, a polyethylene separator, a separator obtained by forming a polypropylene layer on a surface of a polyethylene base, a separator obtained by applying an aramid-based resin to a surface of a polyethylene separator, or the like may be used.

The solvent of the nonaqueous electrolyte is not particularly limited, and any solvent that has been used in a nonaqueous electrolyte secondary battery heretofore can be used. Examples of the solvent include cyclic carbonates such as ethylene carbonate (EC), propylene carbonate (PC), butylene carbonate, and vinylene carbonate (VC); linear carbonates such as dimethyl carbonate (DMC), methyl ethyl carbonate (MEC), and diethyl carbonate (DEC); ester-containing compounds such as methyl acetate, ethyl acetate, propyl acetate, methyl propionate, ethyl propionate, and γ-butyrolactone; sulfone-group-containing compounds such as propane sultone; ether-containing compounds such as 1,2-dimethyoxy ethane, 1,2-diethoxyethane, tetrahydrofuran, 1,2-dioxane, 1,4-dioxane, and 2-methyltetrahydrofran; nitrile-containing compounds such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and amide-containing compounds such as dimethylformamide. In particular, any of these solvents with some H atoms substituted with F atoms is preferably used. These solvents may be used alone or in combination. In particular, a solvent containing a combination of a cyclic carbonate and a linear carbonate and any such solvent further containing a small amount of a nitrile-containing compound or an ether-containing compound are preferable.

An ionic liquid can be used as the nonaqueous solvent of the nonaqueous electrolyte. In such a case, the cationic species and anionic species are not particularly limited; however, from the viewpoints of low-viscosity, electrochemical stability, and hydrophobicity, a combination of a pyridinium cation, an imidazolium cation, or a quaternary ammonium cation as a cation and a fluorine-containing imide-based anion as an anion is particularly preferable.

The solute used in the nonaqueous electrolyte can be a known lithium salt commonly used in nonaqueous electrolyte secondary batteries. A lithium salt containing at least one element selected from P, B, F, O, S, N, and Cl can be used as such a lithium salt. Specific examples thereof include lithium salts such as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, $LiClO_4$, and $LiPF_2O_2$, and mixtures of any of these. In particular, in order to improve the high-rate charge/discharge properties and durability of the nonaqueous electrolyte secondary battery, $LiPF_6$ is preferably used.

A lithium salt containing an oxalato complex as an anion can also be used as the solute. Examples of the lithium salt containing an oxalato complex as an anion include LiBOB (lithium-bisoxalate borate) and a lithium salt having an anion with $C_2O_4^{2-}$ coordinated to the center atom, e.g., a compound represented by $Li[M(C_2O_4)_xR_y]$ (where M represents an element selected from transition metals and group 13, 14, and 15 elements in the periodic table, R represents a group selected from a halogen, an alkyl group, and a halogen-substituted alkyl group, x represents a positive integer, and y represents 0 or a positive integer). Specific examples thereof include $Li[B(C_2O_4)F_2]$, $Li[P(C_2O_4)F_4]$, and $Li[P(C_2O_4)_2F_2]$. However, in order to form a stable coating film on a surface of a negative electrode even in a high-temperature environment, LiBOB is most preferably used.

The aforementioned solutes may be used alone or in combination as a mixture. The solute concentration is not particularly limited, but is preferably 0.8 to 1.7 mol per liter of the nonaqueous electrolyte solution. Furthermore, for the usage that requires discharge of high current, the solute concentration is preferably 1.0 to 1.6 mol per liter of the nonaqueous electrolyte solution.

The present disclosure will now be described further by using examples that do not limit the present disclosure.

Conditions Common to Examples and Comparative Example

Preparation of Negative Electrode Active Material Slurry

Graphite was used as the negative electrode active material. The negative electrode active material, a sodium salt of CMC, and a dispersion of SBR were mixed at a solid content mass ratio of 98.7:0.7:0.6 to prepare a negative electrode active material slurry in which water was used as the dispersion medium.

Negative Electrode Core

A copper foil having a thickness of 10 μm and a width of 550 mm was used.

Method for Applying Negative Electrode Active Material Slurry

Figure 11:
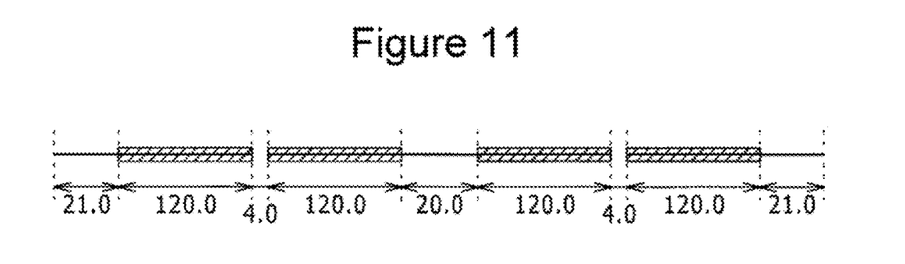
FIG. 11 is a schematic cross-sectional view illustrating a method for applying a negative electrode active material slurry to a negative electrode core performed in Examples 1 to 4 and Comparative Example.

As illustrated in FIG. 11, four lines of the negative electrode active material slurry were applied to both surfaces of the negative electrode core. The width of each applied line was 120 mm, and the mass of the negative electrode active material layer ultimately formed on one surface of the negative electrode core was 10 mg/cm$^2$. The widths of the uncovered portions were, respectively, 21 mm, 4 mm, 20 mm, 4 mm, and 21 mm in sequence from one end in the width direction of the negative electrode core.

Method for Drying Negative Electrode Core

A drying and cooling unit equipped with four drying chambers and two cooling chambers illustrated in FIG. 4 was used. The speed of conveying the negative electrode core was 40 m/min.

Drying Conditions in Examples and Comparative Example

Figure 12:
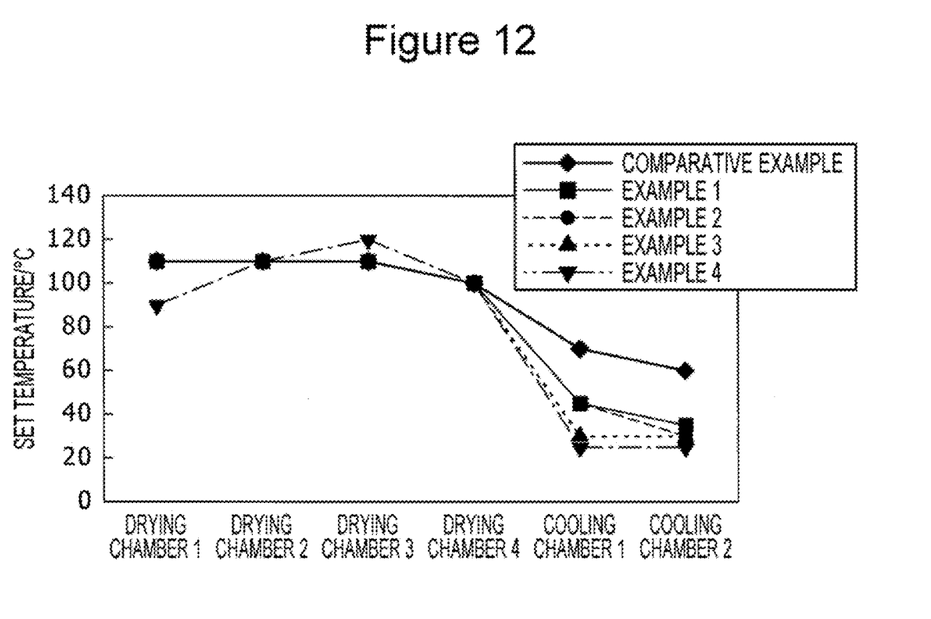
FIG. 12 is a graph illustrating temperatures in chambers respectively set for Examples 1 to 4 and Comparative Example.

In each of Examples and Comparative Example, the temperatures of the respective chambers were set as indicated in FIG. 12.

COMPARATIVE EXAMPLE

The temperature in the drying chamber 1 was set to 110° C., the temperature in the drying chamber 2 was set to 110° C., the temperature in the drying chamber 3 was set to 110° C., the temperature in the drying chamber 4 was set to 100° C., the temperature in the cooling chamber 1 was set to 70° C., and the temperature in the cooling chamber 2 was set to 60° C.

EXAMPLE 1

The temperature in the drying chamber 1 was set to 110° C., the temperature in the drying chamber 2 was set to 110° C., the temperature in the drying chamber 3 was set to 110° C., the temperature in the drying chamber 4 was set to 100° C., the temperature in the cooling chamber 1 was set to 45° C., and the temperature in the cooling chamber 2 was set to 35° C.

EXAMPLE 2

The temperature in the drying chamber 1 was set to 110° C., the temperature in the drying chamber 2 was set to 110° C., the temperature in the drying chamber 3 was set to 110° C., the temperature in the drying chamber 4 was set to 100° C., the temperature in the cooling chamber 1 was set to 45° C., and the temperature in the cooling chamber 2 was set to 30° C.

EXAMPLE 3

The temperature in the drying chamber 1 was set to 110° C., the temperature in the drying chamber 2 was set to 110° C., the temperature in the drying chamber 3 was set to 110° C., the temperature in the drying chamber 4 was set to 100° C., the temperature in the cooling chamber 1 was set to 30° C., and the temperature in the cooling chamber 2 was set to 30° C.

EXAMPLE 4

The temperature in the drying chamber 1 was set to 90° C., the temperature in the drying chamber 2 was set to 110° C., the temperature in the drying chamber 3 was set to 120° C., the temperature in the drying chamber 4 was set to 100° C., the temperature in the cooling chamber 1 was set to 25° C., and the temperature in the cooling chamber 2 was set to 25° C.

Evaluation of Prepared Negative Electrodes

The negative electrodes in which the negative electrode active material layers were formed on both surfaces by drying and cooling under the respective drying and cooling conditions were observed with naked eye to determine whether wrinkles occurred in the negative electrode core exposed portions (uncovered portions), and the negative electrodes were evaluated based on the observation. The evaluation results of Examples and Comparative Example are as indicated in Table.

TABLE

| | Set temperature [° C.] | | | | Set temperature [° C.] | | |
| --- | --- | --- | --- | --- | --- | --- | --- |
| | Drying chamber 1 | Drying chamber 2 | Drying chamber 3 | Drying chamber 4 | Cooling chamber 1 | Cooling chamber 2 | Wrinkling |
| Comparative Example | 110 | 110 | 110 | 100 | 70 | 60 | Observed |
| Example 1 | 110 | 110 | 110 | 100 | 45 | 35 | None |
| Example 2 | 110 | 110 | 110 | 100 | 45 | 30 | None |
| Example 3 | 110 | 110 | 110 | 100 | 30 | 10 | None |
| Example 4 | 90 | 110 | 120 | 100 | 25 | 25 | None |

As indicated in Table, in Comparative Example in which the negative electrode of the negative electrode core only cooled to 60° C. was caused to contact the guide roll, wrinkles occurred in the negative electrode core. In contrast, in Examples 1 to 4 in which the negative electrode of the negative electrode core cooled to 35° C. or lower was caused to contact the guide roll, no wrinkles occurred in the negative electrode core. This demonstrates that when the negative electrode of the negative electrode core cooled to 35° C. or lower after the negative electrode active material slurry is heat-dried is caused to contact the guide roll, the negative electrode core is prevented from wrinkling. The same effect is considered to be obtained as long as the negative electrode core has a temperature of 40° C. or lower when the dried negative electrode is caused to contacts the guide roll.

The negative electrode core exposed portions are likely to wrinkle when a negative electrode in which the negative electrode active material layer formed on one surface of the negative electrode core has a mass per unit area of 2.5 mg/cm$^2$ or more after the cooling step is formed by a method other than the method of the present disclosure. This is because, as described above, the larger the amount of the negative electrode active material slurry applied, the larger the contraction of the negative electrode active material slurry during drying of the negative electrode active material slurry, and thus the negative electrode tends to warp extensively. The effect of the present disclosure is more prominent when the negative electrode active material layer formed on one surface of the negative electrode core has a mass per unit area of 5 mg/cm$^2$ or more after the cooling step since wrinkles are more likely to occur in the negative electrode core exposed portions under such conditions. Thus, the method of the present disclosure is preferably applied to a negative electrode in which the negative electrode active material layer formed on one surface of the negative electrode core has a mass per unit area of 2.5 mg/cm$^2$ or more after the cooling step. The method of the present disclosure is more preferably applied to a negative electrode in which the negative electrode active material layer formed on one surface of the negative electrode core has a mass per unit area of 5 mg/cm$^2$ or more after the cooling step. The upper limit of the per unit area-mass of the negative electrode active material layer formed on one surface of the negative electrode core after the cooling step is not particularly limited, and is preferably, for example, 20 mg/cm$^2$ or less.

When a positive electrode is produced by the method of the present disclosure, the mass of the positive electrode active material layer per unit area formed on one surface of the positive electrode core after the cooling step may be any value. When the mass of the positive electrode active material layer per unit area formed on one surface of the positive electrode core after the cooling step is 5 mg/cm$^2$ or more, the battery yield can be increased while achieving increased battery energy, and thus the effects of the method of the present disclosure can be more prominently exhibited. The effect of the present disclosure is more prominent when the positive electrode active material layer formed on one surface of the positive electrode core has a mass per unit area of 15 mg/cm$^2$ or more after the cooling step. The upper limit of the mass of the positive electrode active material layer per unit area formed on one surface of the positive electrode core after the cooling step is not particularly limited, and is preferably, for example, 40 mg/cm$^2$ or less.

The mass of the negative electrode active material layer per unit area formed on one surface of the negative electrode core after the cooling step may be 2.5 to 20 mg/cm$^2$, 10 to 20 mg/cm$^2$, or 5 to 10 mg/cm$^2$. The mass of the positive electrode active material layer per unit area formed on one surface of the positive electrode core after the cooling step may also be 5 to 40 mg/cm$^2$, 10 to 30 mg/cm$^2$, or 20 to 30 mg/cm$^2$.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A method for producing an electrode of a nonaqueous electrolyte secondary battery, the method comprising:
    an applying step of applying an active material slurry containing an active material, a binder, and a dispersion medium to one surface of a core so as to form a plurality of lines of the active material slurry, the plurality of lines extending in a longitudinal direction of the core and being spaced from each other in a width direction of the core;
    after the applying step, a drying step of blowing first hot air to the core from at least a lower side in a vertical direction while keeping the core aloft;
    after the drying step, a cooling step of blowing first cooling air having a lower temperature than the first hot air from at least the lower side in the vertical direction while keeping the core aloft so as to cool the core until the core has a temperature of 40° C. or lower; and
    a step of forwarding the core after the drying step to a guide roll that imparts a particular tension to the core,
    wherein the cooling step is performed after the core undergoes the drying step and before the core contacts the guide roll and thereby preventing warping due to thermal expansion difference between the active material slurry and the core.

2. The method for producing an electrode of a nonaqueous electrolyte secondary battery according to claim 1, wherein the drying step further includes blowing second hot air having a higher temperature than the first cooling air to the core from an upper side in the vertical direction.

3. The method for producing an electrode of a nonaqueous electrolyte secondary battery according to claim 2, wherein the cooling step further includes blowing second cooling air having a lower temperature than both the first hot air and the second hot air to the core from the upper side in the vertical direction.

4. The method for producing an electrode of a nonaqueous electrolyte secondary battery according to claim 1, wherein, in the cooling step, the core is cooled until the core has a temperature of 35° C. or lower.

5. The method for producing an electrode of a nonaqueous electrolyte secondary battery according to claim 1, wherein the active material slurry is a negative electrode active material slurry, and the core is a negative electrode core, and
    after the cooling step, a negative electrode active material layer formed on the one surface of the negative electrode core has a mass per unit area of 2.5 mg/cm$^2$ or more.

6. The method for producing an electrode of a nonaqueous electrolyte secondary battery according to claim 1, wherein the active material slurry is a positive electrode active material slurry, and the core is a positive electrode core, and after the cooling step, a positive electrode active material layer formed on the one surface of the positive electrode core has a mass per unit area of 5 mg/cm$^2$ or more.

7. A method for producing a nonaqueous electrolyte secondary battery, the method comprising:
an electrode production step of performing the method for producing an electrode of a nonaqueous electrolyte secondary battery according to claim 1;
an electrode assembly preparation step of preparing an electrode assembly formed of a positive electrode, a negative electrode, and a separator between the positive electrode and the negative electrode, wherein at least one of the positive electrode and the negative electrode is the electrode prepared in the electrode production step; and
an electrode assembly placement step of placing the electrode assembly in an outer casing can.

\* \* \* \* \*